US010643277B2

(12) United States Patent
Berta et al.

(10) Patent No.: US 10,643,277 B2
(45) Date of Patent: May 5, 2020

(54) SYSTEMS AND METHODS FOR BILL PAYMENT WITH DYNAMIC LOAN CAPACITY

(71) Applicant: AMERICAN EXPRESS TRAVEL RELATED SERVICES COMPANY, INC., New York, NY (US)

(72) Inventors: Cecile Berta, New York, NY (US); Mehdi Esmail, New York, NY (US); Manish Gupta, Haworth, NJ (US); Malerie Luciano, Brooklyn, NY (US); Houman Motaharian, Glen Rock, NJ (US); Art Ricciardi, Middleton, NJ (US); Aparna Sarin, New York, NY (US); Brett Sussman, New York, NY (US); Fernando Valdes, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 744 days.

(21) Appl. No.: 15/072,094

(22) Filed: Mar. 16, 2016

(65) Prior Publication Data
US 2017/0270603 A1 Sep. 21, 2017

(51) Int. Cl.
*G06Q 20/10* (2012.01)
*G06Q 40/02* (2012.01)
(Continued)

(52) U.S. Cl.
CPC ......... *G06Q 40/025* (2013.01); *G06Q 20/023* (2013.01); *G06Q 20/10* (2013.01);
(Continued)

(58) Field of Classification Search
CPC .............................. G06Q 20/10; G06Q 40/025
(Continued)

(56) References Cited

U.S. PATENT DOCUMENTS 5,884,288 A 3/1999 Chang et al.
5,978,780 A 11/1999 Watson
(Continued)

FOREIGN PATENT DOCUMENTS

JP 2005050375 2/2005
JP 2006107427 4/2006
(Continued)

OTHER PUBLICATIONS

International Search Report and Written Opinion dated May 5, 2017 in Application No. PCT/US2017/019002.
(Continued)

*Primary Examiner* — Robert R Niquette
*Assistant Examiner* — Liz P Nguyen
(74) *Attorney, Agent, or Firm* — Thomas | Horstemeyer, LLP (57) ABSTRACT

A system may detect an outstanding account of a borrower having an outstanding amount. The system may also display a loan-request interface associated with the outstanding account with the loan-request interface activated in response to the outstanding amount being within the dynamically calculated loan capacity. The system may receive an input via the loan-request interface to request a loan based on the outstanding amount. A request for the loan may be transmitted in response to the input.

19 Claims, 5 Drawing Sheets

(51) Int. Cl.
  *G06Q 20/12* (2012.01)
  *G06Q 20/40* (2012.01)
  *G06Q 20/24* (2012.01)
  *G06Q 20/14* (2012.01)
  *G06Q 20/02* (2012.01)

(52) U.S. Cl.
  CPC ............ *G06Q 20/12* (2013.01); *G06Q 20/14* (2013.01); *G06Q 20/24* (2013.01); *G06Q 20/4037* (2013.01)

(58) Field of Classification Search
  USPC .......................................................... 705/38
  See application file for complete search history.

(56) References Cited

U.S. PATENT DOCUMENTS

| | | | |
|---|---|---|---|
| 6,315,193 | B1 | 11/2001 | Hogan |
| 6,611,816 | B2 | 8/2003 | Lebda et al. |
| 6,701,303 | B1 | 3/2004 | Dunn et al. |
| 6,793,131 | B2 | 9/2004 | Hogan |
| 6,839,687 | B1 | 1/2005 | Dent et al. |
| 7,559,217 | B2 | 7/2009 | Bass |
| 7,797,231 | B1 | 9/2010 | Loeb et al. |
| 7,925,580 | B2 | 4/2011 | Brasch |
| 8,117,117 | B2 | 2/2012 | Hu et al. |
| 8,554,668 | B2 | 10/2013 | Hogan |
| 2005/0060257 | A1 | 3/2005 | Fry |
| 2005/0187874 | A1* | 8/2005 | Sanal ............... G06Q 10/08 705/40 |
| 2010/0312691 | A1* | 12/2010 | Johnson, Jr. ....... G06Q 40/02 705/38 |
| 2013/0166437 | A1 | 6/2013 | Miles et al. |
| 2014/0258088 | A1 | 9/2014 | Belarj |
| 2014/0358766 | A1 | 12/2014 | Nayyar et al. |
| 2015/0058260 | A1 | 2/2015 | Mun |
| 2015/0127398 | A1 | 5/2015 | Hoen, IV et al. |
| 2015/0127500 | A1 | 5/2015 | Madala et al. |
| 2015/0324770 | A1 | 11/2015 | Starikova et al. |

FOREIGN PATENT DOCUMENTS

| | | |
|---|---|---|
| JP | 2007004828 | 1/2007 |
| JP | 2012168971 | 9/2012 |
| JP | 2015132880 | 7/2015 |

OTHER PUBLICATIONS

International Preliminary Report on Patentability dated Sep. 25, 2017 in Application No. PCT/US2017/19002.
First Examination Report dated Jun. 28, 2019 in AU Application No. 2017234424.
Non-Final Office Action dated Jul. 22, 2019 in CA Application No. 3017744.
Notice of Reasons for Refusal dated Sep. 2, 2019 in JP Application 2018548408.

* cited by examiner

SYSTEMS AND METHODS FOR BILL PAYMENT WITH DYNAMIC LOAN CAPACITY

FIELD

The present disclosure relates to short-term loan origination, management, disbursement and repayment at the invoice or bill level using a dynamically determined loan capacity.

BACKGROUND

Traditional financial institutions have long offered loans to business, consumers, and other entities. A small business, for example, would apply for the loan by going in person to a bank branch or corresponding with a finance manager and submit a request for a loan amount. The bank may review the small business for financial health before approving a line of credit or a loan. Business owners often desire to avoid the hassle associated with traditional business loans, which may involve in-person visits to a bank branch and a lengthy, time-consuming application process. However, business expenses come up frequently. Bills and invoices can come in at any moment, and the company may not always be in a sufficiently liquid position to dispatch payment in a timely manner.

Credit cards and lines of credit may provide some flexibility in paying bills and managing cash flow without the hassle of applying for a loan or loans to pay expenses. However, those payment sources may also come with high fees or interest rates and paying bills with expensive sources of funds may not be in the company's best interest. Moreover, the short-term nature of credit cards may not provide sufficient time for repayment without incurring those high fees or interest rates, while the time-consuming application process and the long-term, evergreen nature of lines of credit may be daunting.

Factoring and other third-party financing arrangements may also provide some flexibility to manage cash flow, but typically include double-digit interest rates and are typically for businesses with low credit or little to no access to capital.

SUMMARY

A system, method, and computer readable medium (collectively, the "system") is disclosed for loan origination, disbursement and repayment whereby the proceeds of the loans are sent directly to a third party selected by the requestor using a dynamic loan capacity. The system may request a loan amount to pay an account in real-time. The account may include an invoice, an account payable, and/or an account receivable. The account may also include an account amount and an account vendor. The loan amount may be selected to pay the account amount. The system may display the account with a payment interface that is configured to request a loan to pay the account amount to the account vendor. The system may request the loan to pay the account amount to the account vendor in response to a selection in the payment interface. An approval may be contingent on the loan amount being within a borrowing capacity such as, for example, a no-preset-limit capacity. The no-preset-limit capacity may be calculated dynamically by the system. The loan may comprise a payment transferred to the vendor in response to the approval.

In various embodiments, the payment transferred to the account vendor in response to the approval may be made via an automated clearing house (ACH) transfer with a borrower identifier, check, wire transfer, and/or card network. The system may receive a loan request from a borrower to pay the account, and the approval may be contingent on the vendor passing a vendor verification. Vendor verification may tend to ensure that the vendor is not fraudulent, is not on an Office of Foreign Assets Control (OFAC) list, is not related to factoring (i.e., selling accounts receivables), is not in collusion with another party, and/or is otherwise a verified business. The loan may be requested by an application programming interface (API) call to a financial institution. The loan may also be requested using other protocols and interfaces such as, for example, HTTPS or widgets. The payment interface may comprise a "smart" button, which may, for example, be on a partner website or mobile or tablet site and may be configured to activate in response to the loan amount being within the dynamic capacity. The smart button may also activate and/or deactivate in response to gauging risk, relationship length, invoice date, counter-party risk, and/or other suitable risk assessment factors.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Consumers and businesses may be offered loans based on their past payment history and tenure with a financial institution, among other factors. The loan application process may be simplified for applicants in the modified loan provisioning program, so that loan applicants may apply for loans without going through the traditional, in-branch loan approval process for each loan. A loan may be requested by a borrower by applying directly to the financial institution or by requesting the loan through a loan application form accessible from a 3$^{rd}$ party platform. A third-party platform may interact with the financial institution using an API. In that regard, the financial institution may interact with third-party platforms to facilitate payment to a vendor. A loan may be applied for through an interface of the third-party platform and issued by the financial institution to pay an invoice directly to the vendor. Other forms of communication with the financial institution may include communication protocols such as HTTPS, for example.

Figure 1:
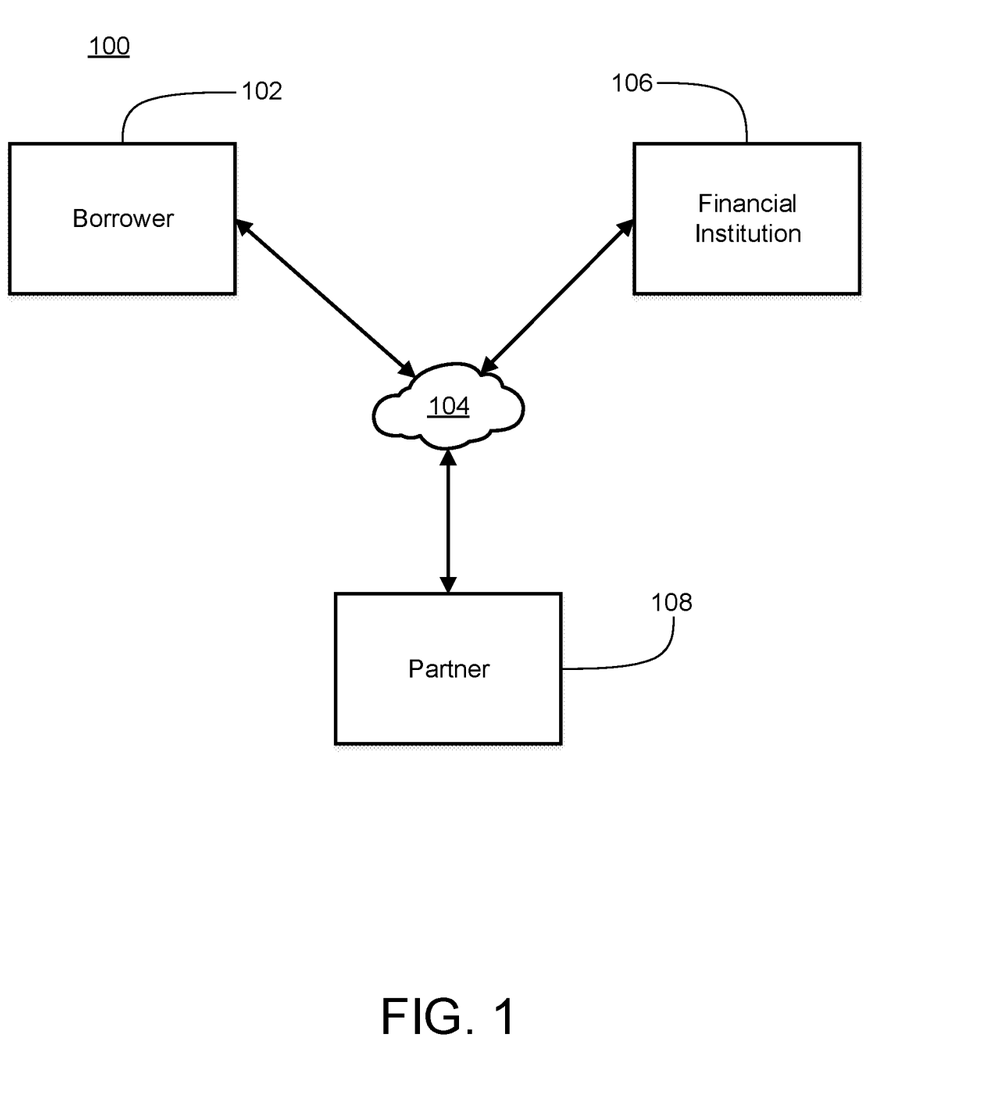
FIG. 1 illustrates an exemplary system for dynamically determining loan amounts for loan payment, in accordance with various embodiments.

With reference to FIG. 1, a system 100 for offering dynamic loan approval without preset approval amounts is shown, in accordance with various embodiments. System 100 comprises a borrower 102 in communication with network 104. Network 104 may be an electronic network such as a cellular network, a LAN, or a WAN that provides a communication channel to financial institution 106 and partner 108. Financial institution 106 may offer financial account services such as payment accounts and various loans. Financial institution may provide, for example, short-term loans used for bill or invoice payment that may have varying repayment periods such as, for example, 30 days, 60 days, or 90 days. Partner 108 may be a partner of financial institution 106 in offering loans to borrower 102. For example, partner 108 may offer the distribution of the loan application form to borrowers on their platform, and financial institution 106 may fund and service the loans. In that regard, partner 108 and/or financial institution 106 may display a loan-request interface to a borrower 102 via a computing device.

In various embodiments, borrower 102 may communicate over network 104 using a computing device or web client. A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client used by borrower 102 may or may not be in direct contact with a server maintained by financial institution 106 and/or partner 108. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® NT®, 95/98/2000/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

In various embodiments, borrower 102 may request a loan by submitting the request to partner 108 or directly to financial institution 106. Partner 108 may forward requests to financial institution 106 in response to receiving the requests. Financial institution 106 may produce an API to interface with partner 108. Partner 108 may thus make API calls to financial institution 106 to request approval of loans for borrower 102. Partner 108 and financial institution 106 may each maintain servers configured to communicate over network 104. Partner 108 and financial institution 106 may also communicate using protocols such as HTTPS, TCP, IP, or other suitable electronic communication protocols, for example. The servers may provide access to a web site or web interface via network 104. Borrower 102 may thus access the partner web site or financial institution web site using a web client.

In various embodiments, borrower 102 may initially apply for the loan program with financial institution 106. The application may be submitted via a web interface maintained on a server of financial institution 106 and accessed using a web client. The application may also be submitted using a custom application configured to run on a computing device such as a web client. During the one-time application process, borrower 102 may submit information to financial institution 106 for review and decisioning. In response to being admitted to the dynamic loan program, borrower 102 may use a dynamically calculated loan capacity to pay outstanding accounts such as bills, invoices, make advances based on expected accounts receivable, and/or other expenses to verified vendors. The terms "dynamically calculated loan capacity" and "no-preset-spending limit" are used herein interchangeably. The cumulative loan amount (i.e., the sum total of loans requested by a borrower 102) may remain within the dynamically calculated loan capacity.

Figure 2:
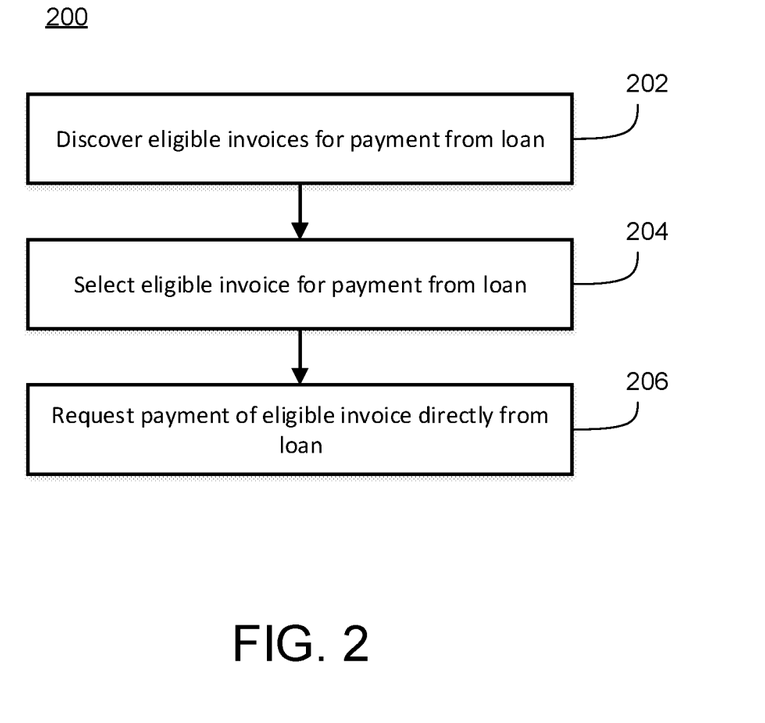
FIG. 2 illustrates an exemplary process for offering automated loan services with loans provided by a financial institution, in accordance with various embodiments.

With reference to FIG. 2, an exemplary process 200 for a partner 108 and/or a financial institution to provide loan payment services to borrower 102 is shown, in accordance with various embodiments. Partner 108 may discover, detect, and/or request eligible invoices for payment using a loan (Block 202). Invoices may be eligible for payment using a loan based on the vendor being verified and the amount being approved for the borrower. Vendor verification may be completed for each borrower 102 that desires to pay an invoice from the vendor. A vendor list may be maintained and auto populated for the borrower to identify the desired vendor and populate the vendor information. A list of verified vendors may be kept for each borrower 102.

In various embodiments, partner 108 may provide accounting, enterprise resource planning, ecommerce, or other services involving payments and/or accounts via an account interface on a web site or application. For example, borrower 102 may use accounting services of partner 108 to track incoming invoices, outgoing invoices, and/or bills. Partner 108 may thus review the listed invoices and discover the invoices that are eligible for payment using the loan services. Partner 108 may query financial institution 106 using an API query to determine whether a vendor is on a vendor verified list.

In various embodiments, partner 108 may select eligible invoices for payment from a loan (Block 204). The invoice may be selected in response to the invoice originating from a verified vendor and having an approved amount. An amount may be approved in response to the amount being within a dynamically calculated limit. The eligible invoice may also be selected in response to an input from borrower 102. For example, borrower 102 may press a smart button, as described in greater detail below.

In various embodiments, a partner 108 may request payment of eligible invoice directly from the loan (Block 206). Financial institution 106 may review the request and make payment to the vendor listed on the invoice in response to approving the request. Financial institution 106 may use payment account information of the vendor to make an automated clearing house (ACH) transfer to the vendor in response to loan approval. Financial institution 106 may provide payment information when making the ACH transfer so that the ACH transfer appears to originate directly from borrower 102. Other payment methods may also be used such as, for example, a check, a wire transfer, a P2P transfer, or a card network transfer.

Figure 3:
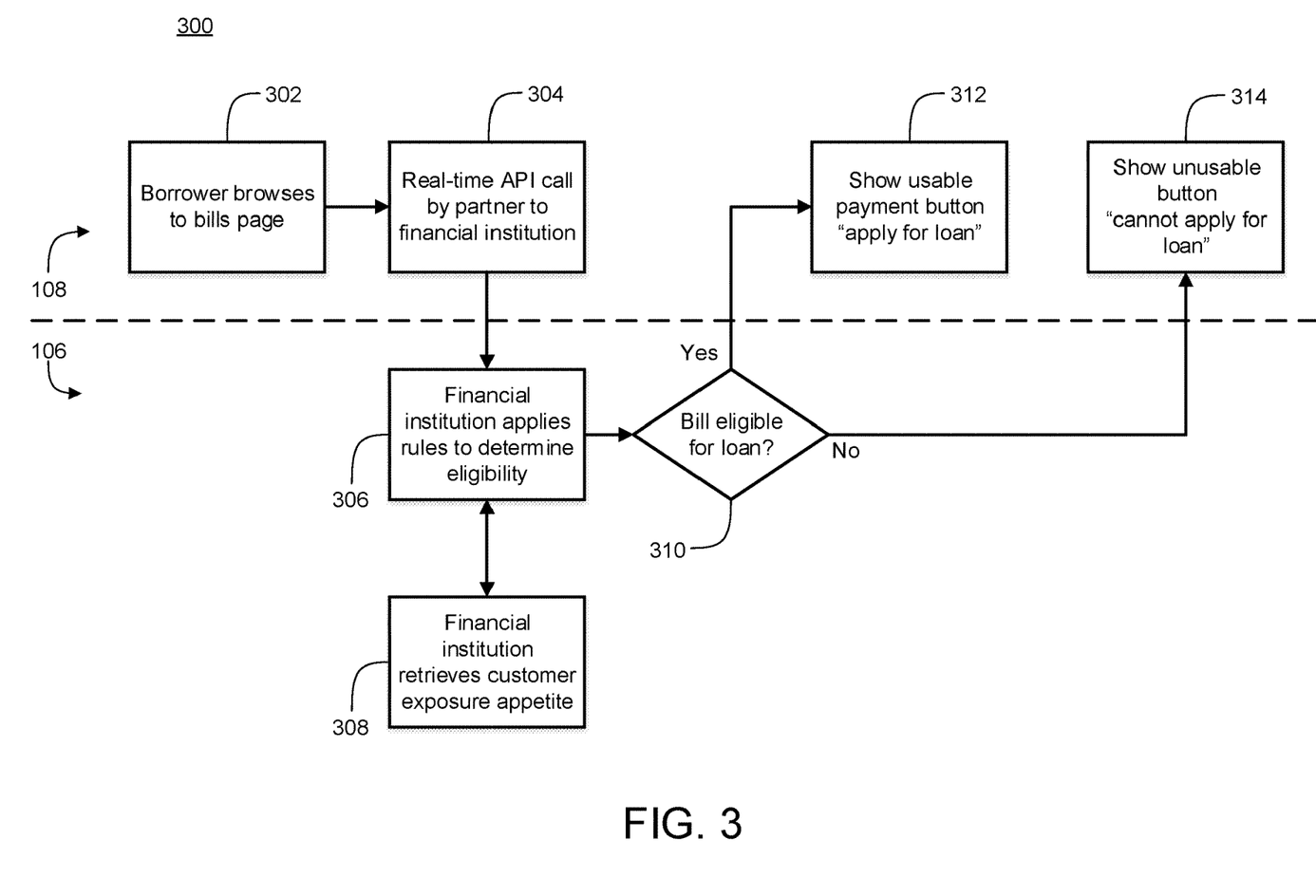
FIG. 3 illustrates an exemplary flow for providing automated loan services using a smart button interface, in accordance with various embodiments.

With reference to FIG. 3, an exemplary system 300 for providing a smart button interface is shown, in accordance with various embodiments. System 300 includes actions taken by partner 108 as well as by financial institution 106. A borrower 102, also referred to as a customer of partner 108, logs into an accounting and/or billing interface provided by partner 108. The customer may browse to a bill page to review pending bills (Block 302). Partner 108 may make a real-time API call to financial institution 106 (Block 304). Partner 108 may pass billing information such as a borrower ID, a billing vendor ID, and/or a bill amount to financial institution 106 for review by way of the API call. Financial institution 106 may apply rules to determine whether the bill is eligible for payment (Block 306).

In various embodiments, the financial institution may retrieve a customer's exposure appetite (Block 308). The customer exposure appetite may correspond to the borrower 102 that is requesting payment. Various factors may be taken into consideration in generating the exposure appetite such as, for example, the length of the buyer/supplier relationship, behavioral data about the borrower available to the financial institution, or other data available through a third party platform. The customer exposure appetite may be a dynamically generated loan amount up to which the borrower 102 is approved. Financial institution 106 may thus retrieve and/or calculate a newly generated customer exposure appetite in response to each payment request. The customer exposure appetite may also be generated on, for example, a big data platform using batch processing or real-time processing to provide updated values.

In various embodiments, the customer exposure appetite may be a dynamically calculated number used to dynamically determine the loan capacity for borrower 102. The dynamically determined loan capacity may correspond to a maximum loan amount that the borrower 102 may qualify for. The dynamically determined loan capacity may be displayed to the borrower through a web interface provided by partner 108 and/or financial institution 106. For example, the dynamically determined loan capacity may be displayed to borrower 102 in response to changes in loan capacity. The loan capacity may also be dynamically updated for further use. For example, in response to borrower 102 taking out a loan, the available dynamically determined loan capacity may be reduced. The dynamically determined loan capacity may be calculated across any loan product available from financial institution 106, with a dynamically calculated limit rather than a static limit.

In various embodiments, the exposure appetite may be calculated to determine the exposure at which the probability of default reaches a predetermined percentage. For example, the exposure appetite for borrower 102 may be calculated to determine the exposure at which borrower 102 has a 3%, 4%, 5%, or 6% chance of default. The desired chance of default may be predetermined and may be set at any desired percentage from 0% to 100%.

The exposure appetite may be modified by authorization controls to dynamically determine the loan capacity for a borrower 102. The authorization controls may include out of pattern spending, no good/final return from ACH payments, over limit, delinquency, policy exposure, or other factors that may impact loan capacity. For example, if the borrower always uses the service to pay accounts $1,000 or less then the pattern of spending may cause financial institution 106 to decline a transaction for $100,000 even though the exposure appetite may suggest that borrower 102 would otherwise be authorized to use the $100,000 amount. The exposure appetite and authorization controls thus dynamically determine loan capacity for the borrower on a given transaction. The dynamically determined loan capacity represents the maximum exposure allowable to the borrower 102 for the requested transaction in real-time. In that regard, dynamically calculated loan capacity (which may also be referred to as dynamic capacity) may be communicated to a borrower and may change based on the borrower's behavior in real-time. Risk-based pricing may also be included at the invoice level to incorporate historical performance and vendor relationships to price individual accounts (e.g., accounts receivable, invoices, bills, etc.) in real time.

In various embodiments, the exposure appetite and/or dynamically determined loan capacity may be recalculated in real-time in response to a payment request. In that regard, in response to a payment made by financial institution 106 on behalf of borrower 102, the dynamically determined loan capacity for borrower 102 may be recalculated to take into account the recent payment.

In various embodiments, financial institution 106 may decide if an account is eligible for payment using a loan (Block 310). Eligibility may be determined based on the exposure appetite and authorization controls, as described above. For example, the account may be eligible for a loan in response to the loan amount being above a certain minimum loan amount, and/or the account having a due date that has not passed. In response to the account being eligible for payment using a loan, partner 108 may display a useable payment button (Block 312). The button may display text similar to "apply for loan" and/or be colored to indicate that the button is available for use. Partner 108 may display an unusable button in response to determining the account is not eligible for payment by loan (Block 314). The unusable button may be greyed out to indicate the button is inactive and include text such as "cannot apply for loan," for example.

Figure 4:
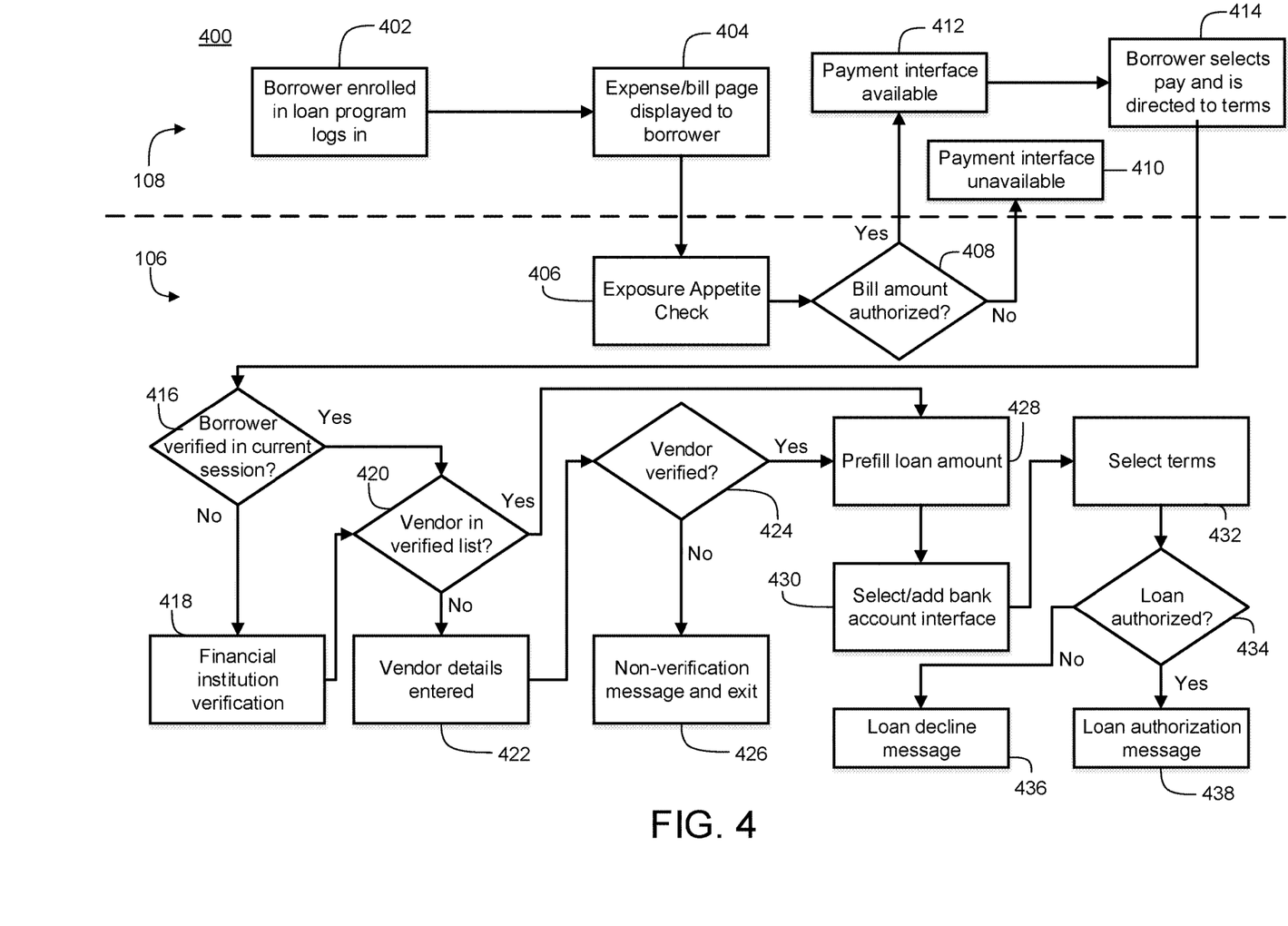
FIG. 4 illustrates an exemplary flow chart for providing loan services through a partner interface with the loans provided by a financial institution, in accordance with various embodiments.

With reference to FIG. 4, system 400 for payment of invoices, accounts payable and/or making loans based on expected accounts receivable using dynamically approved loan proceeds is shown, in accordance with various embodiments. System 400 may interact with a borrower 102 to pay bills received by borrower 102. Borrower 102 may be enrolled in a loan program with financial institution 106 that offers services in conjunction with partner 108. Financial institution 106 and/or partner 108 may also offer loan services independent of one another in system 400. Borrower 102 may log into an application or service for providing loans (Block 402) by way of a web client using authentication methods such as password, one-time password, pin, biometrics, or other user authentication techniques.

In various embodiments, an expense/bill page may be displayed to the authenticated borrower (Block 404). The expense/bill page may include pending bills or other accounts that have not yet been paid. Financial institution 106 may conduct an exposure appetite check (Block 406). Exposure appetite may represent the portion of a budget available for additional payment. Financial institution 106 may determine whether the bill amount is authorized (Block 408). The bill amount may be authorized, for example, if the bill amount is above a minimum dollar threshold and within the exposure appetite. In response to the bill amount being authorized, partner 108 may make available a payment interface (Block 412). In response to the bill amount being declined, partner 108 may make the payment interface unavailable (Block 410). The payment interface may include a smart button, as described above with reference to FIG. 3. The payment interface may also include a graphical interface suitable for accepting customer requests to pay or not pay bills shown on the expense page.

In various embodiments, the customer may select pay and be directed to a terms interface (Block 414). The borrower 102 may be shown terms and conditions and have the continuing process terminated in response to the borrower declining the terms and conditions. Financial institution 106 may determine whether the customer is verified in the current session (Block 416). Verification may include evaluating the authentication conducted by partner 108 at block 402. Financial institution 106 may verify borrower 102 in response to the customer not being verified (Block 418).

In various embodiments, financial institution 106 may check if the vendor that issued the bill to borrower 102 is on a list of verified vendors (Block 420). The list of verified vendors may be maintained separately for each borrower 102. The list of verified vendors may include vendors that are determined to be legitimate businesses as described further below.

In various embodiments, vendor details may be entered in response to the vendor not being on the verified vendor list (Block 422). The vendor details may be auto populated on a web form, for example. Borrower 102 may enter any details that have been omitted or conflict with details the financial institution has. Vendor details may be maintained in a vendor database by financial institution 106 and/or partner 108. The vendor details may also be provided by partner 108 from the information available on the bills page and/or other data sources maintained by partner 108. The vendor details may be checked to determine whether the vendor should be verified (Block 424).

In various embodiments, vendors may go through a verification process with financial institution 106 to be placed on the verified vendor list. A vendor may be verified in response to financial institution 106 determining that the vendor is not fraudulent, is not on an Office of Foreign Assets Control (OFAC) list, is not related to factoring (i.e., selling accounts receivables), and/or is otherwise a verified business. Financial institution 106 may also consider payments made by other borrowers to the vendor in verifying the vendor. The vendor may also be re-verified as desired to ensure that formerly legitimate vendors do not become fraudulent over time.

In various embodiments, financial institution 106 may return a non-verification message and/or exit the payment (Block 426) in response to the vendor validation failing. The non-verification message may be returned to partner 108 for communication to borrower 102 or communicated directly to borrower 102. The non-verification message may thus indicate that the vendor may be fraudulent or otherwise carry an unacceptable risk. In response to the vendor passing verification, the loan amount may be prefilled in a loan interface (Block 428). The loan amount may be the amount of the bill or invoice as communicated from partner 108.

In various embodiments, borrower 102 may be shown a select/add bank account interface (Block 430). The select/add bank account interface may be used to add an account from which payment for the loan may originate at the end of the loan term. Borrower 102 may select terms of the loan (Block 432). The loan term may include a maturation date. The loan term may be, for example, 30, 60, or 90 days.

Although short-term loans are used for exemplary purposes, other loan terms may also be selected by borrower 102.

In various embodiments, financial institution 106 may determine whether the loan is authorized (Block 434). In response to the loan being declined, a loan decline message may be sent (Block 436). In response to the loan being authorized, a loan authorization message may be sent (Block 438). In most instances, the loan should authorize as the amount available is checked against the bill amount in block 408. In instances where other concerns arise during the process, the loan may be declined.

Figure 5:
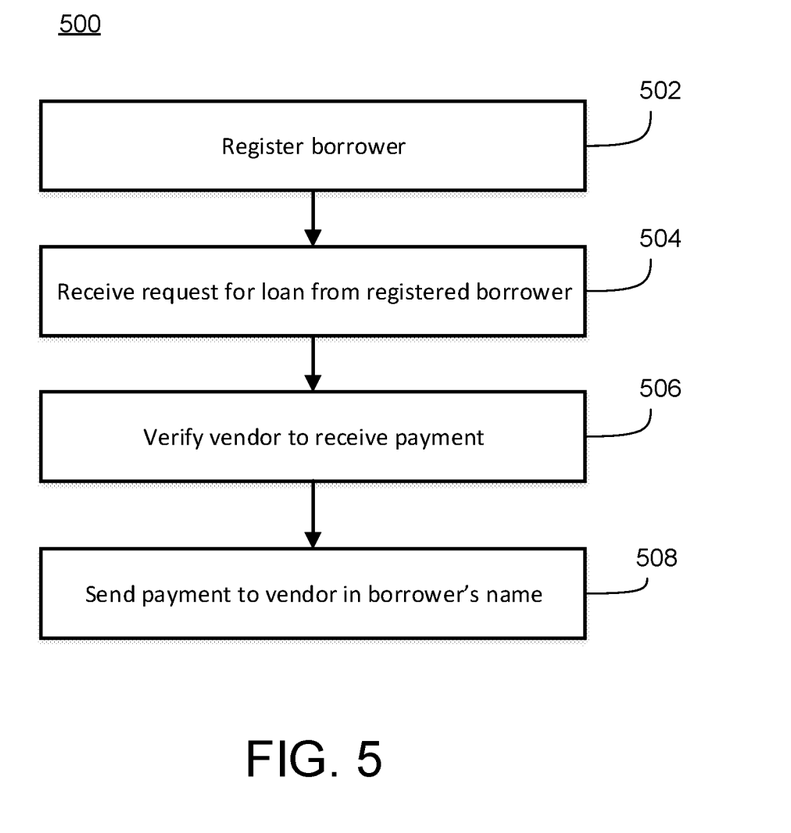
FIG. 5 illustrates an exemplary process for providing a loan based on a dynamically calculated loan capacity to a borrower, in accordance with various embodiments.

With reference to FIG. 5, an exemplary process 500 for offering a loan product with no communicated limit to pay vendor bills is shown, in accordance with various embodiments. Financial institution 106 may register borrower 102 for the loan program (Block 502). The registration process may include information requests sufficient for financial institution 106 to evaluate the financial health of borrower 102. Borrower 102 history with financial institution 106 may also be evaluated during registration. An actual loan need not be approved or declined at the time of registration.

In various embodiments, financial institution 106 may receive a request for a loan from borrower 102 (Block 504). Borrower may submit a request via a partner 108, as described above. Borrower 102 may also submit a request directly to financial institution 106 through, for example, a web interface provided by financial institution 106. Financial institution 106 may display the dynamically calculated loan capacity to borrower 102 on a web interface or other interface to assist in determining whether to request the loan.

In various embodiments, financial institution may verify the vendor to receive the payment (Block 506). The verification process may be conducted in a similar manner to the vendor verification process described above. In response to the vendor being verified, financial institution 106 may send payment to the vendor in the name of borrower 102. The payment may appear in the vendor account with indication that the payment originated from borrower 102. For example, a borrower identifier such as the name, origin, and/or note associated with the transfer may identify borrower 102. In that regard, the fact that payment originated with financial institution 106 may be invisible to the vendor receiving payment. The payment may also be subjected to an authorization process similar to the authorization process described above.

The foregoing systems enable real-time loan approval for bill payment. Vendor verification tends to ensure vendors receiving payment are legitimate businesses. The loans may have a term selectable by the borrower 102, with each term corresponding to a fee for financial institution 106. Borrower 102 may apply for a loan for each payable bill item. Each loan subsequent to enrollment may be approved or declined based in part on a dynamically calculated loan capacity. The loan capacity for a given bill payment may be calculated from a customer exposure appetite and authorization controls. The loan requests may originate from web interfaces maintained by financial institution 106 and/or partner 108. In that regard, the dynamically generated loan capacity and loan processes described herein with reference to FIGS. 3, 4, and 5 may be integrated into partner 108 products (e.g., products for accounting, enterprise resource planning, ecommerce, or other products involving payments and/or accounts) for bill payment to verified vendors.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

The phrases consumer, customer, user, account holder, account affiliate, cardmember or the like shall include any person, entity, business, government organization, business, software, hardware, or machine associated with a transaction account that buys merchant offerings and/or is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifiable information, and the like).

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE®ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, popup window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

Phrases and terms similar to "transaction account" may include any account that may be used to facilitate a financial transaction.

Phrases and terms similar to "financial institution" or "transaction account issuer" may include any entity that offers transaction accounts or similar services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "merchant," "supplier" or "seller" may include any entity that receives payment or other consideration. For example, a supplier may request payment for goods sold to a buyer who holds an account with a transaction account issuer.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   detecting, by a computer-based system, an outstanding account of a borrower by transmitting an API request to a financial institution, the outstanding account having an outstanding amount;
   displaying, by the computer-based system, a loan-request interface associated with the outstanding account, wherein the loan-request interface comprises an apply for loan button that is enabled in response to an exposure appetite being sufficient for the borrower and the outstanding amount being within a dynamically calculated loan capacity;
   receiving, by the computer-based system, an input via the loan-request interface to request a loan based on the outstanding amount; and
   transmitting, by the computer-based system, the request for the loan in response to the input, wherein the borrower receives the loan for bill payment.

2. The method of claim 1, wherein the outstanding account of the borrower comprises at least one of an account receivable, an invoice, or a bill owed to a vendor.

3. The method of claim 2, wherein proceeds of the loan are disbursed to the vendor in response to the request for the loan.

4. The method of claim 1, wherein the loan-request interface and the outstanding account are displayed on at least one of a web site or an application.

5. The method of claim 4, wherein the web site or the application are configured to provide at least one of an accounting interface, an enterprise resource planning interface, or an ecommerce interface.

6. The method of claim 1, wherein the exposure appetite is based upon a length of a relationship between the borrower and a vendor and behavioral data about the borrower available to the financial institution.

7. A method comprising:
   determining in real-time, by a computer-based system, a dynamically calculated loan capacity of a borrower;
   identifying, by the computer-based system, an account having an outstanding amount within the dynamically calculated loan capacity, wherein the outstanding amount is owed to a vendor;
   receiving, by the computer-based system, a request to issue a loan based on the outstanding amount;
   verifying, by the computer-based system, the vendor; and
   disbursing, by the computer-based system, proceeds of the loan directly to the vendor, wherein the borrower receives the loan for bill payment.

8. The method of claim 7, wherein the loan is disbursed directly to the vendor via at least one of an ACH transfer or a wire transfer.

9. The method of claim 8, wherein the loan is disbursed with a borrower identifier to indicate that the loan originated from the borrower.

10. The method of claim 7, further comprising retrieving, by the computer-based system, an exposure appetite for the borrower at which probability of default reaches a predetermined percentage.

11. The method of claim 10, further comprising modifying, by the computer-based system, the exposure appetite based on an authorization control to determine the dynamically calculated loan capacity.

12. The method of claim 7, wherein the identifying the account having the outstanding amount further comprises:
receiving, by the computer-based system, an API request to evaluate the account having the outstanding amount; and
determining, by the computer-based system, that the outstanding amount is within the dynamically calculated loan capacity.

13. An article of manufacture including a non-transitory, tangible computer readable storage medium having instructions stored thereon that, in response to execution by a processor, cause the processor to perform operations comprising:
storing, by the processor, a plurality of outstanding accounts in a database;
designating, by the processor, a type of the outstanding account as a key field in a plurality of related data tables to speed searching for the data;
linking, by the computer-based system, the plurality of related data tables based on the type of the outstanding account in the key fields;
detecting, by the processor, an outstanding account of a borrower from the database by transmitting an API request to a financial institution, the outstanding account having an outstanding amount;
obtaining, by the computer-based system, the outstanding account from the database;
displaying, by the processor, a loan-request interface associated with the outstanding account, wherein the loan-request interface is activated in response to the outstanding amount being within a dynamically calculated loan capacity;
receiving, by the processor, an input via the loan-request interface to request a loan based on the outstanding amount; and
transmitting, by the processor, the request for the loan in response to the input, wherein the borrower receives the loan for bill payment.

14. The method of claim 7, wherein the verifying the vendor comprises maintaining a list of vendors that have been pre-verified.

15. The method of claim 1, further comprising providing, by the computer-based system, a selection for a bank account for paying the loan at an end of a loan term.

16. The method of claim 1, wherein the displaying the loan-request interface is within an accounting system, an enterprise resource planning system or an ecommerce system.

17. The method of claim 1, further comprising:
tuning, by the computer-based system, the database to optimize database performance, wherein the tuning includes placing frequently used files on separate file systems to reduce in and out bottlenecks; and
sorting, by the computer based system, the outstanding account according to a known order to simplify the lookup process.

18. The article of claim 13, wherein a financial institution determines in real-time the dynamically calculated loan capacity of the borrower.

19. The method of claim 1, wherein the dynamically calculated loan capacity is further based upon at least one authorization control, the at least one authorization control comprising at least one of: out of pattern spending, no good/final return from ACH payments, over limit, delinquency or policy exposure.

* * * * *